Mar. 27, 1923.
M. MAILMAN
MILK BOTTLE CAP
Filed Apr. 15 1922
1,449,768
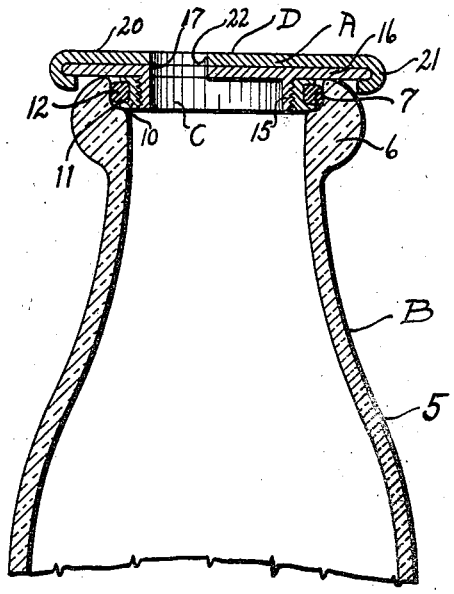
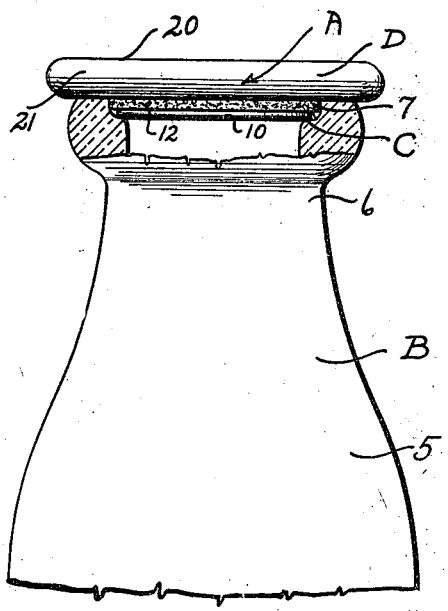
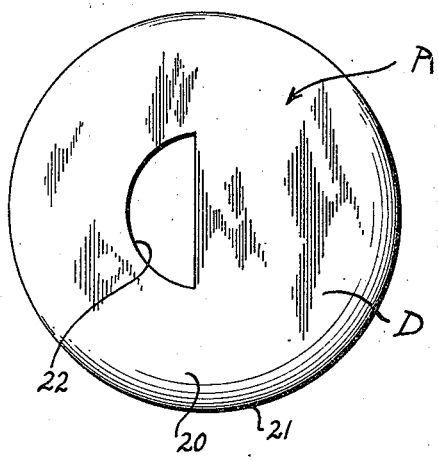
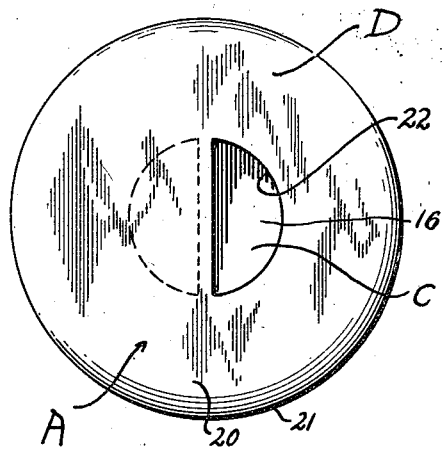
Inventor
Maurice Mailman
By Lancaster and Allwine
Attorneys Patented Mar. 27, 1923.

1,449,768

UNITED STATES PATENT OFFICE.

MAURICE MAILMAN, OF CLEVELAND, OHIO.

MILK-BOTTLE CAP.

Application filed April 15, 1922. Serial No. 552,842.

*To all whom it may concern:*

Be it known that I, MAURICE MAILMAN, a citizen of the United States, residing at Cleveland, in the county of Cuyahoga and State of Ohio, have invented certain new and useful Improvements in Milk-Bottle Caps, of which the following is a specification.

This invention relates to milk bottle caps or closures, and the primary object of the invention is the provision of a novel cap for connection with milk bottles which will retain the milk in a cleanly and sweet condition and which will permit the milk to be poured from the bottle without necessitating the removal of the cap from the bottle.

Another object of the invention is the provision of a sanitary milk bottle cap, embodying a stopper for removable association with the neck of a milk bottle having a passageway therethrough, and a rotatable top carried by the stopper provided with an opening which can be brought into and out of registration with the passageway of the stopper by simply rotating said top.

A further object of the invention is the provision of an improved milk bottle cap embodying a minimum number of parts, which can be readily taken apart to permit the thorough cleaning of the stopper, the stopper being constructed of durable material, whereby the same can be conveniently used with milk bottles.

A still further object of the invention is the provision of a novel milk bottle cap of the above character which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a diametric section through the improved cap showing the same applied to a milk bottle, the milk bottle being shown in section.

Figure 2 is an edge elevation of the improved milk bottle cap showing the same applied to a milk bottle, the bottle being shown partly in section.

Figure 3 is a top plan view of the improved cap, showing the top thereof turned, to permit flow of milk through the cap, and Figure 4 is a plan view of the improved cap showing the top turned to close the way or passage through the cap, so as to prevent the entrance of foreign objects into the milk.

Referring to the drawings in detail, wherein similar reference characters designate corresponding parts throughout the several views, the letter A generally indicates the improved milk bottle cap; and B, a milk bottle with which the same is associated.

The milk bottle B is of the ordinary or any preferred type and has been merely shown to illustrate the use of the improved invention and as shown includes the body 5 and the reduced neck 6, which is provided with an annular shoulder 7 upon which the ordinary paper cap (not shown) is adapted to fit.

The improved cap A is formed of some durable non-corrosive material, such as aluminum and includes the stopper portion C and the rotatable top portion D.

The stopper portion C includes an annular ring 10, the outer surface of which is provided with an annular groove 11 for the reception of a pure rubber gasket 12, which is adapted to frictionally engage the shoulder 7 formed in the reduced neck 6 of the bottle B. The inner surface of the annular portion or ring 10 is provided with internal threads for the reception of the depending sleeve 15 forming a part of the disc-shaped top plate 16. This sleeve 15 is formed concentrically on the top plate 16 and is provided with external threads for engaging the internal threads formed on the ring 10. The disc or top plate 16 is of such a size as to completely overlie the top of the bottle B and has formed therein a semi-circular opening or passageway 17. This passageway 17 communicates with the interior of the sleeve 15.

The top portion D includes a flat disc-shaped plate 20, which is adapted to overlie the plate 16 and this plate is provided with a peripheral inturned flange 21 for receiving the periphery of the plate 16. The flange 21 permits the top D to be turned on the plate 20. The plate 20 has formed therein a semi-circular opening 22, which is of approximately the same size as the opening or passageway 17 and it can be seen that by turning the top D the opening 22 can be moved into alignment with the passageway 17 in order to permit the flow of milk from the bottle. When the top D is turned so as to move the opening 22 from out of alignment with the opening 17, it can be seen that no foreign objects can gain access into the bottle.

If desired, suitable advertising matter can be stamped or placed upon the top D or suitable directions with arrows for describing the use and operation of the improved cap.

It can be seen that as the cap is formed of aluminum, the same will not contaminate the milk in any way and that the cap can always be kept in a cleanly and sanitary condition.

From the foregoing description, it can be seen that a novel and simple milk bottle cap has been provided, which will prevent the entrance of foreign objects into the milk and thus keep the same in a sanitary condition and which will permit the milk to be poured from the bottle without removing the cap therefrom. The cap is of course, adapted to be used in lieu of the ordinary paper cap now on the market, and when the milk bottle is received in the home, the ordinary paper cap is removed, and the improved stopper or cap used instead thereof.

Changes in details may be made without departing from the spirit or scope of this invention; but,

I claim:

1. A milk bottle cap comprising a stopper portion for insertion in the neck of a bottle, a resilient ring carried by the stopper portion for frictionally engaging the neck of a bottle, the stopper portion having a passageway therethrough, and a rotatable cap carried by the stopper portion having a passageway therethrough adapted to be brought into and out of alignment with the passageway in the stopper.

2. As a new article of manufacture, a milk bottle cap formed of aluminum including a ring, a resilient gasket removably carried by the ring, a body detachably associated with the ring including a flat disc shaped plate having a way therethrough, a rotatable top carried by the plate including a flange arranged to receive the plate, the top having an opening therethrough adapted to be moved into and out of alignment with the way in the body.

3. As a new article of manufacture, a milk bottle cap comprising a ring having an annular way formed in the outer surface thereof, a resilient gasket fitted in said way, the inner surface of the ring being provided with threads, a body including a flat top plate and a depending sleeve, the sleeve being externally threaded for engaging the threads of the ring, the top plate having a semi-circular way formed therein, a rotatable top carried by the body including a disc shaped plate, and a depending peripheral flange arranged to receive the periphery of the first mentioned plate, the last mentioned plate having a semi-circular way therein.

MAURICE MAILMAN.